J. D. O'CALLAGHAN.
COMBINED WHEELBARROW AND GARDEN CULTIVATOR.
No. 186,606. Patented Jan. 23, 1877.
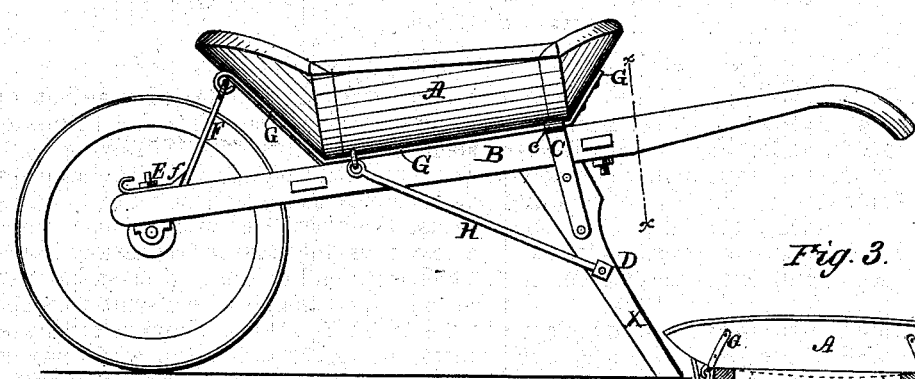
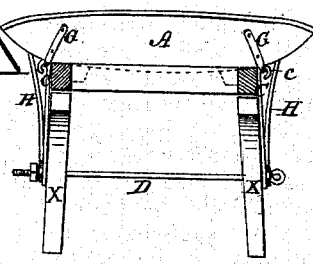
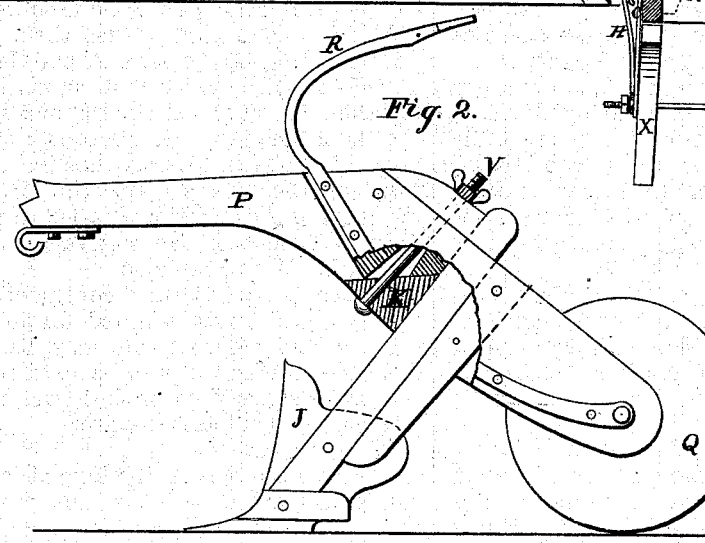
Witnesses:
Inventor:
J. D. O'Callaghan

UNITED STATES PATENT OFFICE.

JOHN D. O'CALLAGHAN, OF CHATTANOOGA, TENNESSEE.

IMPROVEMENT IN COMBINED WHEELBARROW AND GARDEN CULTIVATOR.

Specification forming part of Letters Patent No. 186,606, dated January 23, 1877; application filed November 13, 1876.

*To all whom it may concern:*

Be it known that I, JOHN D. O'CALLAGHAN, of Chattanooga, in the county of Hamilton and State of Tennessee, have invented a new and useful Improvement in Wheelbarrows adapted for Attachment of a Cultivating Device; and I do hereby declare that the following is a full, clear, and exact description of the same.

This invention relates to an improvement upon that for which I received Letters Patent No. 95,718, dated October 12, 1869, for a plow or cultivator attachment for wheelbarrows. In the prior invention the wheelbarrow is represented as constructed in the usual manner. In the present case the cultivating device is constructed mainly as before, but the tray and legs of the wheelbarrow are so constructed and connected together that they may be readily detached from the truck or wheeled frame, whenever it is desired to use the cultivating attachment.

In the accompanying drawing, Figure 1 is a side elevation of a wheelbarrow constructed according to my invention, and Fig. 2 is a side elevation of the cultivating attachment. Fig. 3 is a cross-section of the wheelbarrow on line $x\ x$, Fig. 1.

The cultivating device J P Q R is adapted for attachment to the frame of the wheelbarrow in substantially the same manner as represented in my prior Letters Patent. A new clamp or fastening, K V, is, however, provided for securing the adjustable standard of the plow.

The body of the wheelbarrow is made in the form of a tray, A, and the legs X are hinged to it by means of straps C G. Side braces H extend diagonally from the tray to the legs X, and the latter are connected together by a rod, D, which is screw-threaded at one end, and provided with a nut for drawing the legs together, as shown in Fig. 3. The upper ends of the legs X are cut off obliquely, and bear against the under side of the frame B of the barrow, thus holding the tray firmly in place. The forward end of the tray is supported by the rods F, whose lower ends enter sockets $f$ in the frame B. With the parts arranged as shown in Figs. 1 and 3, the wheelbarrow is complete, and adapted to be used as such.

When it is desired to use the cultivating device J P Q R, the tray A and legs X are detached, which is effected mainly by screwing the nut off from the rod D and withdrawing the latter, thus disconnecting the braces and legs. The latter may then be turned outward on the hinges $c$, and the tray A lifted off, leaving the truck or wheeled frame B free for attachment of the cultivating device, as will be readily understood.

By the above-described construction I provide a wheelbarrow adapted for all the uses of such, and whose frame may be detached from the tray and legs to be used with a cultivating device, thus saving part of the expense of a complete cultivator.

What I claim is—

The combination of the hinged legs X and connecting-rod D with the removable tray A and wheeled frame B, as shown and described, for the purpose of adapting the frame for attachment of and use with a cultivating device, as set forth.

J. D. O'CALLAGHAN.

Witnesses:
   G. C. CONNER,
   S. C. DODGE.